United States Patent
Bourcier et al.

(10) Patent No.: US 7,883,761 B2
(45) Date of Patent: Feb. 8, 2011

(54) MULTIPLE LAYER POLYMER INTERLAYERS HAVING AN EMBOSSED SURFACE

(75) Inventors: David Paul Bourcier, Ludlow, MA (US); John Joseph D'Errico, Glastonbury, CT (US); Jean-Pierre Etienne, Rhode St Genese (BE); Gary Matis, Wilbraham, MA (US); Vincent James Yacovone, Springfield, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 12/509,107

(22) Filed: Jul. 24, 2009

(65) Prior Publication Data

US 2009/0286046 A1  Nov. 19, 2009

Related U.S. Application Data

(63) Continuation of application No. 11/741,765, filed on Apr. 29, 2007.

(51) Int. Cl.
*B32B 3/30* (2006.01)
*B32B 27/42* (2006.01)

(52) U.S. Cl. .................. 428/141; 428/436; 428/437; 428/525

(58) Field of Classification Search .......... 428/141, 428/436, 437, 525
See application file for complete search history.

(56) References Cited

U.S. PATENT DOCUMENTS

| | | | | |
|---|---|---|---|---|
| 3,884,865 A | * | 5/1975 | Fariss et al. | 524/314 |
| 4,276,351 A | * | 6/1981 | Phillips | 428/437 |
| 4,397,976 A | | 8/1983 | Mori | |
| 5,061,333 A | | 10/1991 | Ishikawa | |
| 5,340,654 A | * | 8/1994 | Ueda et al. | 427/437 |
| 5,425,977 A | | 6/1995 | Hopfe | |

(Continued)

FOREIGN PATENT DOCUMENTS

EP  0 710 545 A1  5/1996

(Continued)

OTHER PUBLICATIONS

Tokyo Seimitsu C., Ltd., "Measuring Machine of Surface Roughness Shape SURFCOM Series Description on Parameters", First Edition published Apr. 1, 1999, Seventh Edttion published Jul. 23, 2004, First page, p. 6-1 and last page, with English translation. Apr. 1, 1999.*

*Primary Examiner*—D. S Nakarani
(74) *Attorney, Agent, or Firm*—Lewis, Rice & Fingersh, L.C.

(57) ABSTRACT

The present invention provides multiple layer interlayers having a relatively soft inner layer and relatively stiff outer layers that can be laminated without unacceptable optical distortion and used in various multiple layer glass panel type applications. Multiple layer interlayers of the present invention have surface topography that is formed by embossing the exposed surface of the interlayer, or individual layers of the multiple layer interlayer, after formation of the interlayer or layers. The embossing process is carried out under temperature conditions that prevent the transfer of the embossing to inner layers of the interlayer. By precisely controlling the embossing of the interlayer, lamination of the interlayer with a rigid substrate does not lead to unacceptable optical distortion caused by the transfer of the surface topography through outer, stiffer layers into softer, internal layers of the interlayer.

7 Claims, 1 Drawing Sheet

U.S. PATENT DOCUMENTS

| | | |
|---|---|---|
| 5,455,103 A | 10/1995 | Hoagland |
| 5,728,472 A | 3/1998 | D'Errico |
| 6,077,374 A | 6/2000 | Hopfe |
| 6,093,471 A | 7/2000 | Hopfe |
| 6,159,608 A | 12/2000 | Friedman |
| 6,423,170 B1 | 7/2002 | Friedman |
| 6,451,435 B1 | 9/2002 | Klafka |
| 6,559,212 B1 | 5/2003 | D'Errico |
| 6,617,008 B1 | 9/2003 | Kono |
| 6,649,269 B1 | 11/2003 | Phillips |
| 6,726,979 B2 | 4/2004 | Friedman |
| 6,733,872 B2 | 5/2004 | Nagai |
| 6,737,159 B2 | 5/2004 | Garrett |
| 6,800,355 B2 | 10/2004 | Wong |
| 6,824,868 B2 | 11/2004 | Bell |
| 6,863,956 B1 | 3/2005 | Nakajima |
| 6,903,152 B2 | 6/2005 | Toyama |
| 6,939,612 B2 | 9/2005 | Reyntjens |
| 6,995,891 B2 | 2/2006 | Agrawal |
| 7,074,487 B2 | 7/2006 | Shichiri |
| 7,138,166 B2 | 11/2006 | Rinehart |
| 7,150,905 B2 | 12/2006 | Nakajima |
| 7,236,296 B2 | 6/2007 | Liu |
| 7,238,401 B1 | 7/2007 | Dietz |
| 7,252,887 B2 | 8/2007 | Kobata |
| 2003/0012964 A1 | 1/2003 | Choi |
| 2003/0022015 A1 | 1/2003 | Wong |
| 2003/0113520 A1 | 6/2003 | Takahashi |
| 2004/0191482 A1 | 9/2004 | Nakajima |
| 2005/0048229 A1 | 3/2005 | Elwakil |
| 2005/0084687 A1 | 4/2005 | Scheirs |
| 2005/0181220 A1 | 8/2005 | Kobata |
| 2006/0141212 A1 | 6/2006 | Smith |
| 2006/0198987 A1 | 9/2006 | Grob |
| 2006/0210782 A1 | 9/2006 | Lu |
| 2006/0263608 A1 | 11/2006 | Choi |
| 2007/0048519 A1 | 3/2007 | Anderson |
| 2007/0071955 A9 | 3/2007 | Elwakil |
| 2007/0098964 A1 | 5/2007 | Yacovone |
| 2007/0148472 A1 | 6/2007 | Masaki |

FOREIGN PATENT DOCUMENTS

| | | | |
|---|---|---|---|
| JP | 06-115982 A | * | 4/1994 |
| JP | 09-040444 A | * | 2/1997 |
| JP | 10-045438 A | * | 2/1998 |
| JP | 2000-256043 A | * | 9/2000 |
| JP | 2004-067414 A | * | 3/2004 |
| JP | 2004-083360 A | * | 3/2004 |
| JP | 2004-168646 A | * | 6/2004 |
| WO | 95/05283 A1 | * | 2/1995 |
| WO | 95/19885 A1 | * | 7/1995 |
| WO | WO2004/018197 A | | 3/2004 |
| WO | WO2005/005123 A1 | | 1/2005 |

* cited by examiner

Fig. 1

MULTIPLE LAYER POLYMER INTERLAYERS HAVING AN EMBOSSED SURFACE

CROSS-REFERENCE TO RELATED APPLICATIONS

This application claims priority to and is a continuation of copending U.S. application Ser. No. 11/741,765 filed on Apr. 29, 2007, which is hereby incorporated by reference in its entirety.

FIELD OF THE INVENTION

The present invention is in the field of polymer interlayers and multiple layer glass panels comprising polymer interlayers, and, more specifically, the present invention is in the field of polymer interlayers comprising multiple thermoplastic polymer layers.

BACKGROUND

Poly(vinyl butyral) (PVB) is commonly used in the manufacture of polymer layers that can be used as interlayers in light-transmitting laminates such as safety glass or polymeric laminates. Safety glass often refers to a transparent laminate comprising a poly(vinyl butyral) layer disposed between two sheets of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

The thermoplastic polymer found in safety glass can consist of a single layer of a thermoplastic polymer, such as poly(vinyl butyral), or multiple layers. Multiple layers are useful, for example, in acoustic applications. Conventional attempts at such acoustic dampening have included using thermoplastic polymers with low glass transition temperatures. Other attempts have included using two adjacent layers of thermoplastic polymer wherein the layers have dissimilar characteristics (see, for example U.S. Pat. Nos. 5,340,654 and 5,190,826, and U.S. Patent Application 2003/0139520 A1).

A particular problem encountered with multiple layer interlayers arises at the lamination stage of processing. While single layer interlayers have conventionally been embossed with rollers to impart a texture that facilitates deairing, three layer interlayers having a relatively soft inner layer between two relatively stiff layers can develop optical distortion if embossing of the outer surfaces of the interlayer is transferred to the inner, softer layer. European application EP 0 710 545 A1 details this problem, and cautions against embossing too deeply on the outer layers of a three layer interlayer.

Further improved compositions and methods are needed to enhance the production and optical characteristics of multiple layer glass panels, and specifically multiple layer glass panels comprising multiple layer interlayers.

SUMMARY OF THE INVENTION

The present invention provides multiple layer interlayers having a relatively soft inner layer and relatively stiff outer layers that can be laminated without unacceptable optical distortion and used in various multiple layer glass panel type applications.

Multiple layer interlayers of the present invention have surface topography that is formed by embossing the exposed surface of the interlayer, or individual layers of the multiple layer interlayer, after formation of the interlayer or layers. The embossing process is carried out under temperature conditions that prevent the transfer of the embossing to inner layers of the interlayer.

By precisely controlling the embossing of the interlayer, lamination of the interlayer with a rigid substrate does not lead to unacceptable optical distortion caused by the transfer of the surface topography through outer, stiffer layers into softer, internal layers of the interlayer.

DETAILED DESCRIPTION

The present invention is directed to multiple layer interlayers that are useful in laminated glass applications in which a softer inner polymer layer is disposed between and in contact with more rigid outer layers, for example in applications in which sound suppression is particularly desirable.

One type of multiple layer interlayer that utilizes softer inner layers is multiple layer acoustic interlayers. As disclosed herein, acoustic interlayers of the present invention comprise multiple layers, with a preferred embodiment having a relatively soft layer sandwiched between two relatively stiff layers. The resulting three layer interlayer can generally be used in lamination processes directly in place of conventional, single layer interlayers, with little or no modification to the lamination process.

While the invention will be described herein throughout as applicable to such acoustic interlayers, it will be understood by those of skill in the art that the invention includes multiple layer interlayers—for example three layer interlayers—having an inner polymer layer that is softer than the outer layers between which it is disposed, which includes non-acoustic multiple layer interlayers.

According to the present invention, it has now been surprisingly discovered that deairing and lamination of multiple layer interlayers can be facilitated by embossing the outer surfaces of a multiple layer interlayer without thereby also creating optical distortion in the glazing panel in which the interlayer is used. This result is accomplished by allowing the multiple layer interlayer to cool after initial extrusion, for example after coextrusion of a three polymer layer interlayer, and prior to embossing. The interlayer, in various embodiments, is cooled below 90° C., 80° C., 70° C., or 60° C. In a preferred embodiment, the interlayer is cooled below 60° C.

After cooling, in various embodiments of the present invention, continuously unwound polymer in rolled form, or directly from the die, is fed as a single layer to an embossing station having an embossing roll pressing against a rubber-faced backup roll 10 to 60 centimeters (4" to 24") in diameter at any suitable speed, for example at 305-915 centimeters per minute (10-30 feet per minute). The shaping surface of the embossing roll can be engraved with any desirable surface pattern. In one embodiment, for example, the entire shaping surface of the embossing roll is engraved with a sawtooth configuration. A sawtooth configuration is V-shaped in vertical cross section with the sides of immediately adjacent sawteeth at ninety degrees to each other. The sawteeth form continuous helical ridges on the roll surface, which can be oriented at 45 degrees with respect to the longitudinal roll axis. The frequency of the ridges can be, for example, 127 to 508 per centimeter, or 203 to 508 per centimeter (50 to 200 per inch or 80 to 200 per inch) as measured across the direction of the helix.

The face of the cooperating backup roll can be covered with a high extensibility, temperature-resistant rubber capable of stretching without fracturing. The surface of the embossing roll is regulated to the desired temperature, for example, 121° C. to 232° C. (250° F. to 450° F.), 138° C. to 216° C. (280° F. to 420° F.), or 149° C. to 204° C. (300° F. to 400° F.) by the presence of an appropriate heating medium beneath the embossing surface. A vacuum roll downstream of the nip formed by the embossing and backup rolls can be used to pull the embossed layer from the embossing roll surface. The layer, after passing through the nip, can be removed by the vacuum roll beyond the nip, and then can be passed with high wrap (>135 degrees) over a chilled cooling roll (below 4.44° C. (40° F.)) and then wound into a roll. Alternatively, embossing two sides of an interlayer can be accomplished by passing the interlayer through the same embossing set up a second time, or through a similar, second set up down line.

The interlayer, as described above, can be embossed by heating the outside surfaces of the interlayer to any suitable temperature and at any suitable speed that does not cause the transfer of the embossing pattern into the soft layer/stiff layer interface. Temperatures can be, for example, 121° C. to 232° C. (250° F. to 450° F.), 138° C. to 216° C. (280° F. to 420° F.), or 149° C. to 204° C. (300° F. to 400° F.), and those temperatures can be attained, for example, by processing the interlayer through embossed rollers heated to the desired temperature and having the desired embossing pattern.

Without being bound to theory, it is believed that, by precisely controlling the temperature of the interlayer to maintain a low inner temperature while the outside surfaces are heated sufficiently to allow for embossing and controlling the permanence of the embossed surface, the embossed pattern is effectively kept from pushing through the outer stiffer layers and into the interface between the outer layer and the inner layer at the time of embossing and then later, at the time of lamination. It is the distortion of that interface through embossing and/or laminating that is believed to cause optical distortion in laminates, as has been reported in some prior art (see, for example, EP 0 710 545 A1). Indeed, where that prior art warns against embossing too deeply, multiple layer interlayers of the present invention are not so restricted and, as will be described in detail below, can be embossed well beyond the limits proposed in the prior art.

Embossing is a method of providing a roughened deairing surface to a polymer interlayer or layer (see, for example, U.S. Pat. Nos. 5,425,977 and 6,077,374). Conventional techniques for embossing a polymer layer include passing the layer through a nip between two rotating rolls, one or both of which are embossing rolls having indentations formed in its surface which are complementarily-shaped negatives of the desired embossment pattern (see, for example, U.S. Pat. Nos. 4,671,913; 2,904,844; 2,909,810; 3,994,654; 4,575,540; 5,151,234 and European Application No. 0185,863). Embossing patterns can be regular or random, depending on the application.

One or both surfaces of the outer polymer layers of the interlayer are produced using embossing to produce a layer having the desired "roughness", or "$R_Z$", "pitch", or $R_{SM}$, and permanence. $R_Z$ is a measure of the surface topography of a polymer layer and is an indication of divergence of the surface from a plane. $R_{SM}$ is a measure of the distance between peaks in the topography of the surface of a polymer layer. "Permanence" is a measure of the tendency of the surface of the embossed interlayer to resist the memory inherent in the layer, which results in a tendency of the surface to return to the surface topography that existed prior to embossing. The three measurements will be described in detail, below.

In various embodiments of the present invention, a multiple layer interlayer having a softer inner polymer layer is produced using the embossing techniques taught herein in which one or both of the outer surfaces of the interlayer have an $R_Z$ value of 50 to 90, 60 to 90, or 60 to 80. The two outer surfaces can have the same $R_Z$ value or a different value. In other embodiments, only one of the two outer surfaces has the designated $R_Z$ value. In yet other embodiments, either one or both of the outer layers of an interlayer have the designated $R_Z$ value on the inner surface, which is disposed in contact with an inner, relatively soft layer, which is found, for example, in non-coextrusion embodiments in which multiple individual layers are laminated together to form a multiple layer interlayer.

In various embodiments of the present invention, the outer surfaces of an interlayer of the present invention have an $R_{SM}$ value of less than 700, 650, or 600. In further embodiments, only one outer surface has the designated $R_{SM}$ value. In yet other embodiments, one or both of the inner surfaces of the outer layers of an interlayer have the designated $R_{SM}$ value. The $R_{SM}$ values given can be combined with the $R_Z$ values given in any suitable combination to produce the desired surface characteristics.

Multiple layer interlayers of the present invention, in various embodiments, have a "permanence value", which will be described in detail below, of less than 95%, less than 90%, less than 80%, less than 70%, or less than 60%, and these permanence values, again, can be combined with any of the given $R_{SM}$ values and $R_Z$ values in any suitable combination to produce the desired surface characteristics. In other embodiments, permanence values of one or both outer surfaces are 40% to 95% or 50% to 90%.

Examples of preferred combinations of the three surface characteristics for one or both surfaces of the multiple layer interlayers of the present invention include, without limitation, the following combinations, which are arranged in the order $R_Z$///$R_{SM}$///permanence and are separated by semicolons, and where $R_Z$ and $R_{SM}$ are given in microns and permanence is given as a percentage: 50 to 90///any///less than 95; 50 to 90///any///less than 90; 50 to 90///any///40 to 95; 50 to 90///less than 700///less than 95; 50 to 90///less than 700///less than 90; 50 to 90///less than 700///40 to 95; 60 to 80///any/// less than 95; 60 to 80///any///less than 90; 60 to 80///any///40 to 95; 60 to 80///less than 700///less than 95; 60 to 80///less than 700///less than 90; and 60 to 80///less than 700///40 to 95.

The resulting interlayer, with the specified $R_Z$ and/or $R_{SM}$ and/or permanence value can be readily laminated between two glazing layers such as glass. The $R_Z$ and $R_{SM}$ values given above, which are imparted by embossing and which are present on at least one, and preferably both outer surfaces of the outer layers of a multiple layer interlayer, result in outer surfaces that can be readily deaired after they are placed in contact with glass layers and laminated, for example using a vacuum bag deairing process.

As used herein, having an "embossed X value", where "X" is $R_Z$ or $R_{SM}$, means that surface qualities measured by $R_Z$ and $R_{SM}$ have been produced through embossing after the extrusion and cooling, and it is the embossed surface that is being measured.

Some embodiments of multiple layer interlayers of the present invention that function to reduce sound transmission through a glass panel include those known in the art, for example, and not limited to, those disclosed in U.S. Pat. No. 5,190,826, which teaches the use of acetals of differing carbon length, Japanese Patent Application 3124441A and U.S. Patent Application 2003/0139520 A1, which teach the use of differing polymerization degree, and Japanese Patent 3,377,848 and U.S. Pat. No. 5,340,654, which teach the use of residual acetate levels of at least 5 mole % in one of two adjacent layers as a compositional difference.

In a preferred embodiment, superior sound suppression characteristics can be imparted to multiple layer glass panels by incorporating a multiple layer interlayer into the panels, where the interlayer comprises two polymer layers having different plasticizer concentrations.

By formulating polymer layers as described above, sound transmission through multiple layer glass panels can be reduced by, for example, more than 2 decibels in the frequency or frequency region of interest. Further, because embodiments having three polymer layer layers can be formulated to be easily handled and used as a direct replacement for conventional interlayers in conventional processes, interlayers of the present invention will be usable in many applications without requiring any modification to the manufacturing method used in the applications. For example, automotive windshield applications can involve the use of a conventional polymeric interlayer that can be replaced with an interlayer of the present invention without altering the lamination process used to form the finished windshield.

As used herein, an "interlayer" is any thermoplastic construct that can be used in multiple layer glass applications, such as safety glass in windshields and architectural windows, and a "multiple layer" interlayer is any interlayer that is formed by combining, usually through laminating processes or coextrusion, two or more individual layers into a single interlayer.

In various embodiments of the present invention, a multiple layer interlayer comprises two polymer layers disposed in contact with each other, wherein each polymer layer comprises a thermoplastic polymer, as detailed elsewhere herein. The thermoplastic polymer can be the same or different in each layer.

In a preferred embodiment, as described below, a high plasticizer content polymer layer is sandwiched between two low plasticizer content layers to form a three layer interlayer. The composition of the polymer layers is such that net migration of plasticizer from one polymer layer to another is negligible or zero, thereby maintaining the plasticizer differential.

As used herein, "plasticizer content" can be measured as parts per hundred resin (phr) parts, on a weight per weight basis. For example, if 30 grams of plasticizer is added to 100 grams of polymer resin, then the plasticizer content of the resulting plasticized polymer would be 30 phr. As used herein throughout, when the plasticizer content of a polymer layer is given, the plasticizer content of that particular layer is determined with reference to the phr of the plasticizer in the melt that was used to produce that particular layer.

For layer of unknown plasticizer content, the plasticizer content can be determined via a wet chemical method in which an appropriate solvent, or a mixture of solvents, is used to extract the plasticizer out of the layer. By knowing the weight of the sample and the weight of the extracted layer, the plasticizer content in phr can be calculated. In the case of a multiple polymer layer interlayer, one polymer layer can be physically separated from the other before the plasticizer content in each of the polymer layers is measured.

In various embodiments of the present invention, the plasticizer content of the two polymer layers differ by at least 8 phr, 10 phr, 12 phr, 15 phr, 18 phr, 20 phr, or 25 phr. Each layer can have, for example 30 to 100 phr, 40 to 90 phr, or 50 to 80 phr.

In various embodiments of the present invention, the residual hydroxyl contents of the thermoplastic polymer components of the polymer layers are different, which allows for the fabrication of layers with stable plasticizer differences. As used herein, residual hydroxyl content (as vinyl hydroxyl content or poly(vinyl alcohol) (PVOH) content) refers to the amount of hydroxyl groups remaining as side groups on the polymer chains after processing is complete. For example, poly(vinyl butyral) can be manufactured by hydrolyzing poly(vinyl acetate) to poly(vinyl alcohol), and then reacting the poly(vinyl alcohol) with butyraldehyde to form poly(vinyl butyral). In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished poly(vinyl butyral), there will typically be residual acetate groups (as vinyl acetate groups) and residual hydroxyl groups (as vinyl hydroxyl groups) as side groups on the polymer chain. As used herein, residual hydroxyl content is measured on a weight percent basis per ASTM 1396.

In various embodiments of the present invention, the residual hydroxyl content of the two adjacent polymer layers can differ by at least 1.8%, 2.0%, 2.2%, 2.5%, 3.0%, 4.0%, 5.0%, 7.5%, or by at least 10%. This difference is calculated by subtracting the residual hydroxyl content of the layer with the lower residual hydroxyl content from the residual hydroxyl content of the layer with the greater residual hydroxyl content. For example, if a first polymer layer has a residual hydroxyl content of 20 weight percent, and a second polymer layer has a residual hydroxyl content of 17 weight percent, then the residual hydroxyl content of the two layers differs by 3 weight percent.

For a given type of plasticizer, the compatibility of that plasticizer in a poly(vinyl butyral) is largely determined by the hydroxyl content. Typically, poly(vinyl butyral) with a greater residual hydroxyl content will result in a reduced plasticizer compatibility or capacity. Likewise, poly(vinyl butyral) with a lower residual hydroxyl content will result in an increased plasticizer compatibility or capacity. These properties can be used to select the hydroxyl content of each poly(vinyl butyral) polymer and formulate each of the polymer layers to allow for the proper plasticizer loading and to stably maintain the difference in plasticizer content between the polymer layers.

As is known in the art, residual hydroxyl content can be controlled by controlling reaction times, reactant concentrations, and other variables in the manufacturing process. In various embodiments, the residual hydroxyl content of the two layers is as follows: first layer less than 25% and second layer less than 23%; first layer less than 23% and second layer less than 21%; first layer less than 21% and second layer less than 19%; first layer less than 20% and second layer less than 17%; first layer less than 18% and second layer less than 15%; first layer less than 15% and second layer less than 12%. In any of these embodiments, any of the values given in a previous paragraph for the difference in hydroxyl content between the two layers can be used.

As used herein throughout, the relative terms "soft/softer" and "stiff/stiffer" refer to the tensile break stress of the polymer layer. As used herein, tensile break stress, or tensile strength, of a polymer layer is defined and measured according to the method described in JIS K6771, with a relatively "soft" polymer layer having a lower tensile break stress value than a relatively "stiff" polymer layer. In various embodiments of the present invention, two polymer layers have a tensile break stress according to the following, wherein the first polymer layer in the following list is the polymer layer with the lower plasticizer content: first polymer layer greater than 135 kilograms per square centimeter and second polymer layer less than 120 kilograms per square centimeter; first polymer layer greater than 150 kilograms per square centimeter and second polymer layer less than 135 kilograms per square centimeter; first polymer layer greater than 165 kilograms per square centimeter and second polymer layer less than 150 kilograms per square centimeter; or first polymer layer greater than 180 kilograms per square centimeter and second polymer layer less than 165 kilograms per square centimeter. A third polymer layer, disposed in contact with the second polymer layer opposite the first polymer layer so as to sandwich the second polymer layer between the first and third polymer layers, can be added to any of the above embodiments, with the third layer having the same or different composition as the first polymer layer, and preferably having the same composition as the first polymer layer.

While the tensile break stress values provided in the preceding paragraph represent values that could be used for acoustic type multiple layer interlayers, those of skill in the art will recognize that the methods and interlayers of the present invention are useful for any multiple layer interlayer having a relatively soft inner layer and one or more relatively stiff outer layers. Accordingly, in various embodiments of the present invention, one or both outer layers have a tensile break stress that is an least 15 kilograms per square centimeter, 20 kilograms per square centimeter, or 25 kilograms per square centimeter greater than the tensile break stress of a softer inner layer.

As used herein, a conventional laminated glass is formed through laminating a conventional interlayer, which is typically used today for commercial laminated glass, wherein the conventional interlayer has a tensile break stress of 200 kilograms per square centimeter or higher. For the purpose of the present invention, conventional laminated glass is referred to as a "reference laminate panel" or "reference panel."

Improvement in acoustic insulation as used to characterize glass laminates consisting of the interlayers of the present invention is determined with reference to a reference laminate panel as described in the previous paragraph. In typical laminates with two outer layers of glass, the "combined glass thickness" is the sum of the thickness of the two layers of glass; in more complex laminates with three or more layers of glass, the combined glass thickness would be the sum of the three or more layers of glass.

For purposes of the present invention a "coincident frequency" means the frequency at which a panel exhibit a dip in sound transmission loss due to "coincident effect". The coincident frequency of the reference panel is typically in the range of 2,000 to 6,000 Hertz, and can be empirically determined from a monolithic sheet of glass having a thickness equal to the combined glass thickness of glass in the reference panel from the algorithm $$f_c = \frac{15{,}000}{d}$$

where "d" is the total glass thickness in millimeters and "$f_c$" is in Hertz.

For purposes of this invention, improvement in acoustic performance can be measured by an increase in sound transmission loss at the coincident frequency (reference frequency) of the reference panel.

"Sound transmission loss" is determined for a laminate of the present invention or conventional reference panel of fixed dimensions with ASTM E90 (95) at a fixed temperature of 20° C.

In various embodiments of the present invention, multiple layer interlayers of the present invention, when laminated between two panes of glass sheet, reduce the transmission of sound through the laminated glass panel by at least 2 decibels (dB) relative to a comparable reference panel having a single conventional interlayer with a thickness comparable to that of the multiple layer interlayer of the present invention.

In various embodiments of the present invention, interlayers of the present invention, when laminated between two sheets of glass, improve the sound transmission loss by at least 2 dB, more preferably 4 dB, more preferably 6 dB or higher, and even more preferably 8 dB or higher at the reference frequency relative to a comparable reference panel.

Prior art attempts to produce interlayers comprising adjacent polymer layers that reduce sound transmission through a multiple layer glass panel have relied on various compositional permutations between those layers. Examples include U.S. Pat. No. 5,190,826, which teaches the use of acetals of differing carbon length, and Japanese Patent Application 3124441A and U.S. Patent Application 2003/0139520 A1, which teach the use of differing polymerization degree. Two other applications, Japanese Patent 3,377,848 and U.S. Pat. No. 5,340,654, teach the use of residual acetate levels of at least 5 mole % in one of two adjacent layers as a compositional difference.

In various embodiments of the present invention, and distinctly different from the approach used in those applications, two adjacent polymer layers of the present invention have the differing plasticizer content as described above, and each further can have a residual acetate content of less than 5 mole %, less than 4 mole %, less than 3 mole %, less than 2 mole %, or less than 1 mole %. These residual acetate concentrations can be combined with the residual hydroxyl contents given above, in any combination, to form two polymer layers of the present invention having the described differences in plasticizer content and residual hydroxyl content while having little to no residual acetate content. Further embodiments of multiple layer interlayers of the present invention include interlayers having more than two polymer layers, wherein one or more of the additional polymer layers has a residual acetate content of less than 5 mole %, less than 4 mole %, less than 3 mole %, less than 2 mole %, or less than 1 mole %.

Further embodiments of the present invention, which are the preferred embodiments, include any of the foregoing embodiments further comprising a third polymer layer that is disposed in contact with the softer polymer layer, for example, the one having the higher plasticizer content. Addition of this third polymer layer results in a three layer construct that has the following structure: First polymer layer that is relatively stiff//Second polymer layer that is relatively soft//Third polymer layer. This third polymer layer can have the same composition as the first polymer layer, as it does in preferred embodiments, or it can be different. While the preferred embodiments of the present invention have a soft inner layer disposed between an in contact with two stiffer outer layers, it will be understood by those of skill in the art that the methods of the present invention can also be applied to two layer interlayers and interlayers having more than three layers. For example, a variation within the scope of the present invention would be a five layer interlayer having two stiffer outer layers and three inner softer layers.

In various embodiments, the third polymer layer has the same composition as the first polymer layer, which provides a three layer interlayer that has a relatively difficult to handle polymer layer disposed between two relatively easy to handle layers, resulting in a multiple layer interlayer that is relatively easy to handle and which can be incorporated directly into existing processes that previously used a single polymer layer having the composition of the outer two polymer layers of the interlayer of the present invention, or a composition that results in similar processing characteristics (for example, blocking tendency).

In other embodiments utilizing three polymer layers in a single interlayer, the third polymer layer has a different composition than the first polymer layer, and the differences in composition between the third polymer layer and the second polymer layer can be any of the differences given above for the differences between the first polymer layer and the second polymer layer. For example, one exemplary embodiment would be: first polymer layer with a residual hydroxyl content of 20%//second polymer layer with a residual hydroxyl content of 16%//third polymer layer with a residual hydroxyl content of 18%. It will be noted that, in this example, the third polymer layer differs from the second polymer layer at least in that it has a residual hydroxyl content that is 2% greater than the hydroxyl content of the second polymer layer. Of course, any of the other differences noted herein throughout can singly or in combination distinguish the third polymer layer from the second polymer layer.

Other conventional layers, as are known in the art, can be incorporated into the interlayers of the present invention. For example, polymer films (described in detail elsewhere herein) such as polyesters like poly(ethylene terephthalate) having a metallized layer, an infrared reflecting stack, or other performance layer deposited thereon, can be included between any two polymer layers of the present invention, where appropriate. For example, in a two layer embodiment, an interlayer can be fabricated with the following layout: polymer layer with relatively high plasticizer content//polyester film having a performance layer//polymer layer with relatively low plasticizer content. In general, additional layers of thermoplastics, such as poly(vinyl butyral), polyester films, primer layers, and hardcoat layers can be added to the multiple layer interlayers of the present invention according to the desired result and the particular application.

The preferred method of producing interlayers of the present invention is through the simultaneous coextrusion of multiple, for example three, polymer layers. For the purposes of the present invention, coextrusion of multiple melts results in multiple polymer layers being formed together as one interlayer.

Figure 1:
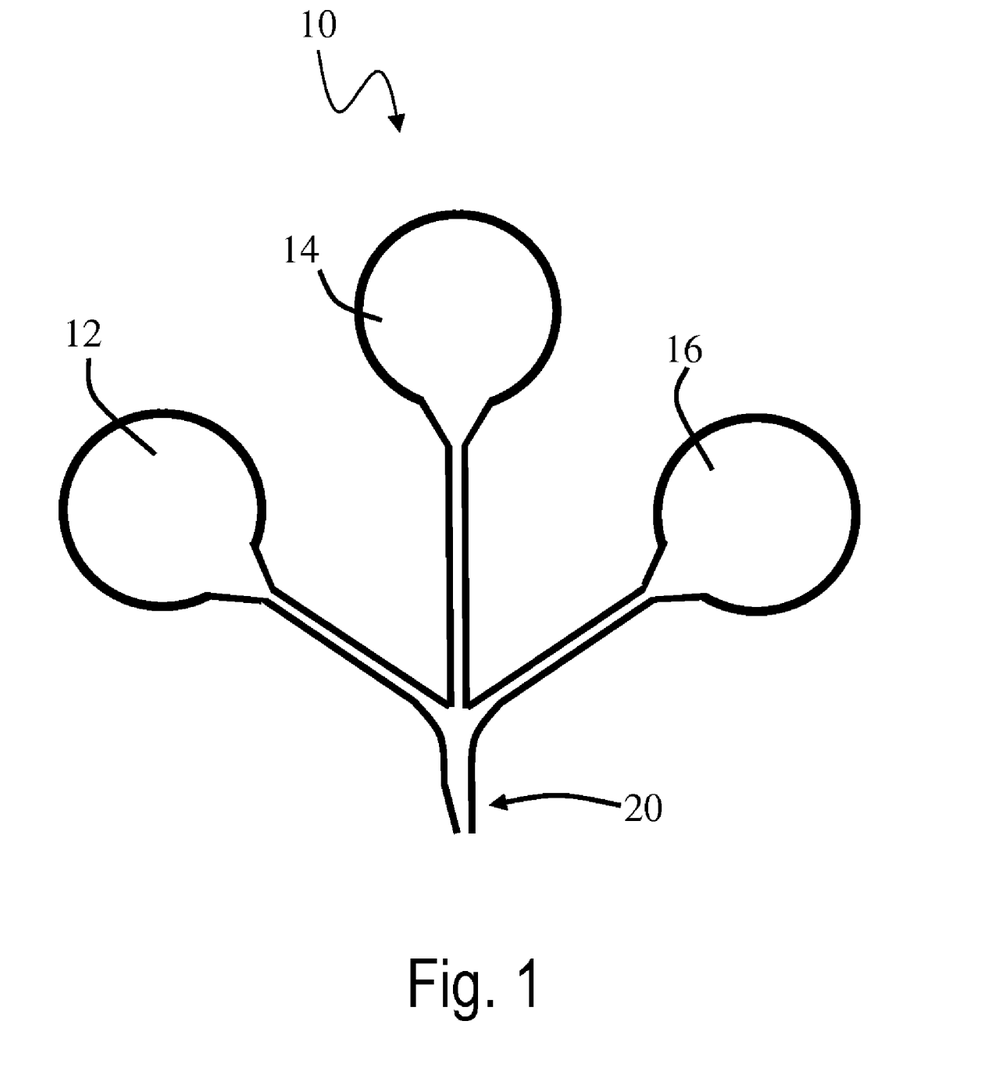
FIG. 1 represents a schematic cross sectional view of a multiple manifold coextrusion device of the present invention.

Multiple layer interlayers of the present invention are preferably coextruded using a multiple manifold coextrusion device such as the one shown in FIG. 1. As shown in schematic cross sectional view generally at 10, an extrusion device has a first die manifold 12 a second die manifold 14, and a third die manifold 16. The device shown in FIG. 1 operates by simultaneously extruding polymer melts from each manifold (12, 14, 16) toward the extrusion opening 20, where the multiple layer interlayer is extruded as a composite of three individual polymer layers. Layer thickness can be varied by adjusting the distance between the die lips at the extrusion opening 20.

As used herein, a "polymer layer" includes layers that are produced individually and layers that are coextruded. For example, an interlayer that is produced by coextruding three melts will have three individual "polymer layers" just as will an interlayer that is produced by laminating three individually produced polymer layers into a single interlayer.

In addition to the interlayers provided herein, the present invention also provides methods of reducing the level of sound through an opening, comprising the step of disposing in the opening a multiple layer glass panel comprising any of the interlayers of the present invention.

The present invention also includes methods of manufacturing a multiple layer glazing, comprising laminating any of the interlayers of the present invention between two rigid, transparent panels, as are known in the art, such as glass or acrylic layers.

The present invention also includes multiple layer glass panels, such as windshields and architectural windows, comprising a multiple layer interlayer of the present invention.

Also included are multiple layer glazing panels having plastics, such as acrylics, or other suitable materials in place of the glass panels.

The present invention also includes a method of making a polymer interlayer having an internal layer with a relatively low tensile break stress compared to the outside layers by forming a first polymer melt, a second polymer melt, and a third polymer melt, and optionally a fourth or more polymer melts; and, coextruding said first polymer melt, said second polymer melt, and said third polymer to form an interlayer, and, optionally, said fourth or more polymer melts, cooling the interlayer to a suitable temperature, as described elsewhere herein, heating a surface of the interlayer to a suitable temperature, as described elsewhere herein, and, embossing said surface of said interlayer to an $R_z$ of 20 to 90, or 20-70.

For these embodiments, $R_{SM}$ and the permanence value can be any as given elsewhere herein. Examples of preferred combinations of the three surface characteristics for one or both surfaces of the multiple layer interlayers of the present invention include, without limitation, the following combinations, which are arranged in the order $R_z$///$R_{SM}$///permanence and are separated by semicolons, and where $R_z$ and $R_{SM}$ are given in microns and permanence is given as a percentage: 20 to 90///any///less than 95; 20 to 90///any///less than 90; 20 to 90///any///40 to 95; 20 to 90///less than 700/// less than 95; 20 to 90///less than 700///less than 90; 20 to 90///less than 700///40 to 95; 20-70///any///less than 95; 20-70///any///less than 90; 20-70///any///40 to 95; 20-70///less than 700///less than 95; 20-70///less than 700///less than 90; and 20-70///less than 700///40 to 95.

Polymer Film

As used herein, a "polymer film" means a relatively thin and rigid polymer layer that functions as a performance enhancing layer. Polymer films differ from polymer layers, as used herein, in that polymer films do not themselves provide the necessary penetration resistance and glass retention properties to a multiple layer glazing structure, but rather provide performance improvements, such as infrared absorption character. Poly(ethylene terephthalate) is most commonly used as a polymer film.

In various embodiments, the polymer film layer has a thickness of 0.013 mm to 0.20 mm, preferably 0.025 mm to 0.1 mm, or 0.04 to 0.06 mm. The polymer film layer can optionally be surface treated or coated to improve one or more properties, such as adhesion or infrared radiation reflection. These functional performance layers include, for example, a multi-layer stack for reflecting infra-red solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side), and usually has a greater, in some embodiments significantly greater, tensile modulus regardless of composition than that of any adjacent polymer layer. In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film layer comprises materials such as re-stretched thermoplastic films having the noted properties, which include polyesters, for example poly(ethylene terephthalate) and poly(ethylene terephthalate) glycol (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly(ethylene terephthalate) film that can be used with the present invention are disclosed in published European Application No. 0157030. Polymer films of the present invention can also include a hardcoat and/or and antifog layer, as are known in the art.

Polymer Layer

As used herein, a "polymer layer" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer layers.

The polymer layer can comprise any suitable polymer, and, in a preferred embodiment, the polymer layer comprises poly(vinyl butyral). In any of the embodiments of the present invention given herein that comprise poly(vinyl butyral) as the polymeric component of the polymer layer, another embodiment is included in which the polymer component consists of or consists essentially of poly(vinyl butyral). In these embodiments, any of the variations in additives disclosed herein can be used with the polymer layer having a polymer consisting of or consisting essentially of poly(vinyl butyral).

In one embodiment, the polymer layer comprises a polymer based on partially acetalized poly(vinyl alcohol)s. In another embodiment, the polymer layer comprises a polymer selected from the group consisting of poly(vinyl butyral), polyurethane, polyvinyl chloride, poly(ethylene vinyl acetate), combinations thereof, and the like. In other embodiments, the polymer layer comprises plasticized poly(vinyl butyral). In further embodiments the polymer layer comprises poly(vinyl butyral) and one or more other polymers. Other polymers having a proper plasticizing capacity can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer layers.

For embodiments comprising poly(vinyl butyral), the poly(vinyl butyral) can be produced by known acetalization processes that involve reacting poly(vinyl alcohol) with butyraldehyde in the presence of an acid catalyst, followed by neutralization of the catalyst, separation, stabilization, and drying of the resin, with the understanding that in various embodiments, residual hydroxyl content will be controlled, as described elsewhere herein.

In various embodiments, the polymer layer comprises poly(vinyl butyral) having a molecular weight greater than 30,000, 40,000, 50,000, 55,000, 60,000, 65,000, 70,000, 120,000, 250,000, or 350,000 grams per mole (g/mole or Daltons). Small quantities of a dialdehyde or trialdehyde can also be added during the acetalization step to increase molecular weight to greater than 350,000 Daltons (see, for example, U.S. Pat. Nos. 4,874,814; 4,814,529; and 4,654,179). As used herein, the term "molecular weight" means the weight average molecular weight.

If additional, conventional polymer layers are used in addition to any of the embodiments described above as having plasticizer content differences, those additional, conventional polymer layers can comprise 20 to 60, 25 to 60, 20 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

Any suitable plasticizers can be added to the polymer resins of the present invention in order to form the polymer layers. Plasticizers used in the polymer layers of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779, and $C_6$ to $C_8$ adipate esters, such as hexyl adipate. In preferred embodiments, the plasticizer is triethylene glycol di-(2-ethylhexanoate).

Adhesion control agents (ACAs) can also be included in the polymer layers of the present invention to impart the desired adhesiveness. These agents can be incorporated into the outer layers in a three polymer layer embodiment, for example. Any of the ACAs disclosed in U.S. Pat. No. 5,728,472 can be used. Additionally, residual sodium acetate and/or potassium acetate can be adjusted by varying the amount of the associated hydroxide used in acid neutralization. In various embodiments, polymer layers of the present invention comprise, in addition to sodium acetate, magnesium bis(2-ethyl butyrate) (chemical abstracts number 79992-76-0). The magnesium salt can be included in an amount effective to control adhesion of the polymer layer to glass.

Additives may be incorporated into the polymer layer to enhance its performance in a final product. Such additives include, but are not limited to, plasticizers, dyes, pigments, stabilizers (e.g., ultraviolet stabilizers), antioxidants, flame retardants, other IR absorbers, anti-block agents, combinations of the foregoing additives, and the like, as are known in the art.

Agents that selectively absorb light in the visible or near infrared spectrum can be added to any of the appropriate polymer layers. Agents that can be used include dyes and pigments such as indium tin oxide, antimony tin oxide, or lanthanum hexaboride ($LaB_6$).

Any suitable method can be used to produce poly(vinyl butyral). Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a mixture of resin with a plasticizer and, optionally, other additives.

One exemplary method of forming a poly(vinyl butyral) layer comprises extruding molten poly(vinyl butyral) comprising resin, plasticizer, and additives and then forcing the melt through a sheet die (for example, a die having an opening that is substantially greater in one dimension than in a perpendicular dimension). Another exemplary method of forming a poly(vinyl butyral) layer comprises casting a melt from a die onto a roller, solidifying the resin, and subsequently removing the solidified resin as a sheet.

In various embodiments, a "prelaminate" interlayer is formed by assembling the individual layers into a stack of layers, and then subjecting the layers to sufficient heat and pressure to tack the layers together, thereby forming the prelaminate. The prelaminate can then be rolled or otherwise stored as desired until it is used in a laminated glazing, at which point the prelaminate is placed between two layers of glass and laminated to form the final multiple layer glazing.

In various embodiments, the interlayers of the present invention can have total thicknesses of 0.1 to 2.5 millimeters, 0.2 to 2.0 millimeters, 0.25 to 1.75 millimeters, and 0.3 to 1.5 millimeters (mm). The individual polymer layers of a multiple layer interlayer can have, for example, approximately equal thicknesses that, when added together, result in the total thickness ranges given above. Of course, in other embodiments, the thicknesses of the layers can be different, and can still add to the total thicknesses given above. For example, the outer layers can be 0.18 to 0.36 millimeters, and the inner layer can be 0.12 to 0.16 millimeters, with a total thickness of 0.51 to 0.89 millimeters.

In various embodiments of the present invention, any of the layers, and particularly the outer layers can have a thickness of 0.05 to 0.71 millimeters (2 to 28 mils), 0.05 to 0.64 millimeters (2 to 25 mils), or 0.05 to 0.51 millimeters (2 to 20 mils). These thickness ranges can be combined with any of the values given elsewhere herein for $R_Z$, $R_{SM}$, and permanence. In a preferred embodiment, one or both of the outer layers of a multiple layer interlayer has a thickness of 0.05 to 0.71 millimeters, 0.05 to 0.64 millimeters, or 0.05 to 0.51 millimeters and an $R_Z$ of 50 to 90, 60 to 90, or 60 to 80.

The parameters for the polymer layer described above apply as well to any layer in a multiple layer construct of the present invention that is a poly(vinyl butyral) type layer.

The following paragraphs describe various techniques that can be used to improve and/or measure the characteristics of the polymer layer.

To determine $R_Z$ and $R_{SM}$, a 15 centimeter by 15 centimeter test sample of plasticized polymer layer is placed on a vacuum plate regulated by fluid at room temperature circulating through it. A vacuum of 3.44 kPa (5 psi) is imposed to draw the sample against the plate surface. A model S8P Perthometer with a PRK drive unit and an RFHTB-250 tracing stylus (available from Mahr Gage Co., New York) is used to directly measure layer surface roughness of each side of the test sample. Profile selection is set to "R" on the instrument. The tracing stylus moves automatically across the sample surface. The length of each trace ($L_T$) is 17.5 millimeter composed of 7 sequential sample lengths $L_C$ of 2.5 mm. The measuring length ($L_m$) is 12.5 millimeter and is composed of the 5 sequential sample lengths ($L_C$) obtained by eliminating the first and the last sections of each trace. The average value of individual roughness depths in these five sequential sample lengths $L_C$ is determined and $R_Z$ is the average of ten such determinations, five taken in the machine direction of extrusion (MD) and five in the cross machine direction (CMD). The distance between two consecutive traces in each direction is 3 mm. $R_{SM}$, the average peak distance, is determined from the same measurement as for $R_Z$. Mean distance of all profile peaks within the each measuring length ($L_m$) is determined and the reported $R_{SM}$ for each machine direction is the average of five such determinations on that direction. Set-up switch positions on the Perthometer during $R_Z$ and $R_{SM}$ are as follows: Filter: GS, Profile: R, LC: N 2.5 mm, LT: 17.5 mm, VB: 625 micrometers. $R_Z$ and $R_{SM}$ values herein throughout are given in micrometers.

Polymer layers of the present invention are also characterized by their "permanence," which is determined according to the following technique: For polymer layers that are embossed, a polymer layer is measured for $R_Z$ ($R_Z$ Base) prior to embossing. After embossing, a second $R_Z$ measurement is taken ($R_Z$ Final). For polymer layers that are not embossed a roughness measurement, $R_Z$, is taken and designated $R_Z$ Final, and $R_Z$ Base is given the value zero. For both embossed and non-embossed layers, a 12.7 centimeter square sample is then cut from the polymer layer. Poly(ethylene terephthalate) film is placed on the edges of one half of a wood frame resting on a horizontal surface, wherein the frame periphery is slightly smaller than the polymer layer sample. The polymer layer sample is then placed on the wood frame so that the poly(ethylene terephthalate) film is between the wood frame and the edges of the polymer layer, in which position it prevents the polymer film from adhering to the wood frame, which would make disassembly difficult. A second poly(ethylene terephthalate) film is then place over the polymer layer, and the second half of the wooden frame is then placed on top of the poly(ethylene terephthalate) film. The two frame halves are then clamped together with binder clips, thereby sandwiching the polymer layer between the two poly(ethylene terephthalate) films and the two frame halves. The frame and polymer assembly is then placed in a preheated oven for 5 minutes at 100° C. The assembly is then removed and allowed to cool. Another $R_Z$ value is then determined for the polymer layer sample ($R_Z$ 100° C.).

A permanence value can then be determined according to the following formula:

$$\text{Permanence} = \left[\frac{(Rz\ 100°\ C.) - (Rz\ \text{Base})}{(Rz\ \text{Final}) - (Rz\ \text{Base})}\right] \times 100$$

The following procedure is used to measure mottle: A shadow graph (a xenon light powered by a kni-tron rectifier (model number R-2120-2) from Kneisley Electric company, Toledo, Ohio) is positioned in a dark room at 1 meter from a white surface. A sample is held between the white surface and the light source next to a "maximum standard level" standard laminate that represents the lowest acceptable optical quality. The image projected on the white surface is visually examined. If the sample image is worse than the maximum standard level standard, then the sample is rejected as having too much distortion. If the sample is at least as good as the maximum standard level standard, then the sample is compared to progressively optically superior standards until a grade is determined for the sample. The sample is evaluated in the cross machine direction and the machine direction, and the worst grade of the two is designated the grade for the sample. A grade of 0 indicates that no optical distortion is visible. A grade of 1 or 2 indicates some minor distortion is observable. A grade of 3 to 4 indicates that more than minor distortion is apparent. A grade of 5 or higher indicates that significant distortion is observable and the laminate would likely be unusable in applications that require visual clarity, such as in automobile windshields.

The clarity of a polymer layer, and particularly a poly(vinyl butyral) layer, can be determined by measuring the haze value, which is a quantification of the amount of light scattered away from the direction of the incident beam in passing through the layer. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

The visible transmittance can be quantified using a UV-Vis-NIR spectrophotometer such as the Lambda 900 made by Perkin Elmer Corp. by methods described in international standard ISO 9050:1990. In various embodiments, the transmittance through a polymer layer of the present invention is at least 60%, at least 70%, or at least 80%.

Pummel adhesion can be measured according to the following technique, and where "pummel" is referred to herein to quantify adhesion of a polymer layer to glass, the following technique is used to determine pummel. Two-ply glass laminate samples are prepared with standard autoclave lamination conditions. The laminates are cooled to about −18° C. (0° F.) and manually pummeled with a hammer to break the glass. All broken glass that is not adhered to the poly(vinyl butyral) layer is then removed, and the amount of glass left adhered to the poly(vinyl butyral) layer is visually compared with a set of standards. The standards correspond to a scale in which varying degrees of glass remain adhered to the poly(vinyl butyral) layer. In particular, at a pummel standard of zero, no glass is left adhered to the poly(vinyl butyral) layer. At a pummel standard of 10, 100% of the glass remains adhered to the poly(vinyl butyral) layer. Poly(vinyl butyral) layers of the present invention can have, for example, a pummel value of between 3 and 10.

Tensile break stress can be determined for a polymer layer according to the procedure described in JIS K6771.

EXAMPLES

Example 1

Two, three-layer interlayer samples are separately coextruded in a length that can be later cut into three separate interlayers. Each interlayer comprises a 0.1524 millimeter (6 mil) layer sandwiched between two 0.3302 millimeters (13 mil) layers for a total thickness of 0.8128 millimeters (32 mils). The inner layer comprises 75 phr plasticizer (triethylene glycol di-(2-ethylhexanoate)) and 11.0% residual poly-vinyl alcohol, while the outside layers comprise 38 phr plasticizer (triethylene glycol di-(2-ethylhexanoate)) and 18.5% residual polyvinyl alcohol.

Surface characteristics of the two interlayer samples are controlled during coextrusion with melt fracture to provide differing levels of $R_Z$. The first interlayer—sample A—has an $R_Z$ of about 20. The second interlayer—sample B—has an $R_Z$ of about 40. The exact $R_Z$ values are given in Table 1, where "CMD" is cross machine direction and "MD" is machine direction and where measurements from both sides of each interlayer are shown:

TABLE 1

| Sample | CMD | | MD | |
|---|---|---|---|---|
| | $R_Z$ | $R_{SM}$ | $R_Z$ | $R_{SM}$ |
| A (Side 1) | 21.4 | 256.5 | 21.7 | 407.2 |
| A (Side 2) | 22.6 | 277.5 | 21.4 | 368.4 |
| B (Side 1) | 42.5 | 405.9 | 40.2 | 619.2 |
| B (Side 2) | 40.6 | 396.3 | 41.8 | 635.0 |

Sample A is then cut into four separate interlayers and sample B is also divided into four separate interlayers.

Three of the separate interlayers for each sample is then embossed. Embossing is performed as described elsewhere herein with an embossing pattern of 49.2 lines per centimeter (125 lines per inch). One interlayer of each sample is left unembossed.

The Tables below provide the embossing conditions and the resulting $R_{SM}$ and $R_Z$.

Table 2 shows the results for interlayers formed from sample A and from sample B that are embossed at 174° C. (345° F.) at a rate of 7.6 meters (25 feet) per minute.

TABLE 2

| Sample | CMD | | MD | |
|---|---|---|---|---|
| | $R_Z$ | $R_{SM}$ | $R_Z$ | $R_{SM}$ |
| A (Side 1) | 31.3 | 287.0 | 34.3 | 266.1 |
| A (Side 2) | 33.9 | 281.7 | 35.6 | 298.1 |
| B (Side 1) | 51.2 | 300.0 | 53.0 | 335.2 |
| B (Side 2) | 54.2 | 319.8 | 52.5 | 375.7 |

Table 3 shows the results for interlayers formed from sample A and from sample B that are embossed at 193° C. (380° F.) at a rate of 7.6 meters (25 feet) per minute.

TABLE 3

| Sample | CMD $R_Z$ | CMD $R_{SM}$ | MD $R_Z$ | MD $R_{SM}$ |
|---|---|---|---|---|
| A (Side 1) | 39.3 | 286.7 | 41.3 | 292.1 |
| A (Side 2) | 43.1 | 280.4 | 42.9 | 285.5 |
| B (Side 1) | 55.5 | 310.0 | 57.5 | 348.3 |
| B (Side 2) | 56.5 | 312.7 | 55.1 | 312.9 |

Table 4 shows the results for interlayers formed from sample A and from sample B that are embossed at 204° C. (400° F.) at a rate of 4.6 meters (15 feet) per minute.

TABLE 4

| Sample | CMD $R_Z$ | CMD $R_{SM}$ | MD $R_Z$ | MD $R_{SM}$ |
|---|---|---|---|---|
| A (Side 1) | 59.0 | 280.3 | 59.8 | 282.8 |
| A (Side 2) | 61.0 | 297.6 | 61.8 | 266.0 |
| B (Side 1) | 69.4 | 266.0 | 71.7 | 290.7 |
| B (Side 2) | 67.6 | 311.5 | 67.8 | 279.3 |

The six embossed samples shown in Tables 2, 3, and 4 are then placed in a frame and polymer assembly, according to the method for testing permanence as described in detail, above, and the frame and polymer assembly are then placed in a preheated oven for 5 minutes at 100° C. After cooling the six embossed samples are tested again for $R_{SM}$ and $R_Z$, and the results are show in Tables 5, 6, and 7.

Table 5 shows the results for interlayers formed from sample A and from sample B that are embossed at 174° C. (345° F.) at a rate of 7.6 meters (25 feet) per minute.

TABLE 5

| Sample | CMD $R_Z$ | CMD $R_{SM}$ | MD $R_Z$ | MD $R_{SM}$ |
|---|---|---|---|---|
| A (Side 1) | 25.6 | 293.7 | 26.8 | 323.4 |
| A (Side 2) | 25.7 | 276.0 | 24.9 | 332.7 |
| B (Side 1) | 49.1 | 387.7 | 51.2 | 571.8 |
| B (Side 2) | 55.1 | 478.1 | 52.8 | 620.6 |

Table 6 shows the results for interlayers formed from sample A and from sample B that are embossed at 193° C. (380° F.) at a rate of 7.6 meters (25 feet) per minute.

TABLE 6

| Sample | CMD $R_Z$ | CMD $R_{SM}$ | MD $R_Z$ | MD $R_{SM}$ |
|---|---|---|---|---|
| A (Side 1) | 28.7 | 281.8 | 30.2 | 300.5 |
| A (Side 2) | 30.2 | 273.3 | 31.3 | 293.6 |
| B (Side 1) | 50.8 | 374.3 | 55.1 | 450.3 |
| B (Side 2) | 51.0 | 370.3 | 52.6 | 429.4 |

Table 7 shows the results for interlayers formed from sample A and from sample B that are embossed at 204° C. (400° F.) at a rate of 4.6 meters (15 feet) per minute.

TABLE 7

| Sample | CMD $R_Z$ | CMD $R_{SM}$ | MD $R_Z$ | MD $R_{SM}$ |
|---|---|---|---|---|
| A (Side 1) | 47.4 | 277.8 | 49.0 | 292.1 |
| A (Side 2) | 50.4 | 294.9 | 50.7 | 269.5 |
| B (Side 1) | 60.9 | 284.3 | 65.8 | 305.9 |
| B (Side 2) | 60.9 | 330.8 | 64.6 | 295.1 |

From the data in Tables 1 through 7, permanence values for each of the six embossed interlayers are determined, according to the method provided elsewhere herein. Results are provided in Table 8.

TABLE 8

| 174° C. at 7.6 meters per minute | | 193° C. at 7.6 meters per minute | | 204° C. at 4.6 meters per minute | |
|---|---|---|---|---|---|
| Sample | Permanence | Sample | Permanence | Sample | Permanence |
| A (Side 1) | 52.0 | A (Side 1) | 67.1 | A (Side 1) | 89.0 |
| A (Side 2) | 41.8 | A (Side 2) | 67.4 | A (Side 2) | 90.2 |
| B (Side 1) | 44.9 | B (Side 1) | 70.2 | B (Side 1) | 91.6 |
| B (Side 2) | 38.9 | B (Side 2) | 69.4 | B (Side 2) | 92.3 |

The six embossed samples, as well as the two samples that are unembossed, are placed between two panes of glass and laminated. Lamination is a multistep process in which the poly(vinyl butyral) sheets and glass are converted to a combined final form of safety glass having desirable performance and optical clarity characteristics.

Vacuum bag deairing is a technique that is used to evacuate air from a rigid substrate/interlayer/rigid substrate construction prior to the final step of autoclaving. It frequently can be employed to improve autoclave yields in commercial operations. Samples are placed in a resilient rubber bag, which is then evacuated by a vacuum hose mated to the bag. In one embodiment, the bag is brought up to and held at a temperature of about 50° C. for 60 minutes and then to 120° C. for 20 minutes while under vacuum. The bag is then cooled and the resulting panel is removed and placed in an autoclave for final finishing.

Light transmission measurements, as a percentage, are taken after vacuum bag deairing and before autoclaving. A higher number indicates low cloudiness, which means that little or no air remains in the rigid substrate/interlayer/rigid substrate construct.

Mottle measurements are taken after autoclaving.

Light transmission is tested with an adhesion photometer (Tokyo Denshoku #S-904356). Each laminate is tested eight times at dispersed locations throughout the laminate, and the eight results are averaged to give light transmission, as shown in Table 9, where LT is light transmission.

TABLE 9

| Unembossed | | 174° C. at 7.6 meters per minute | | 193° C. at 7.6 meters per minute | | 204° C. at 4.6 meters per minute | |
|---|---|---|---|---|---|---|---|
| Sample | LT | Sample | LT | Sample | LT | Sample | LT |
| A | 63.4 | A | 99.4 | A | 99.6 | A | 99.4 |
| B | 67.8 | B | 99.0 | B | 99.5 | B | 99.4 |

Mottle is determined as described elsewhere herein, with results from 5 observers averaged to provide a final mottle grade. Results are shown in Table 10, where "Smp" is sample, "MD" is machine direction, "CMD" is cross machine direction, and "Final" is the mottle grade, which is the greater of the machine direction and cross machine direction results.

TABLE 10

| Unembossed | | 174° C. at 7.6 meters per minute | | 193° C. at 7.6 meters per minute | | 204° C. at 4.6 meters per minute | |
|---|---|---|---|---|---|---|---|
| Smp | Mottle (MD/CMD/Final) | Smp | Mottle (MD/CMD/Final) | Smp | Mottle (MD/CMD/Ave) | Smp | Mottle (MD/CMD/Final) |
| A | 1/1/1 | A | 1/1/1 | A | 1/1/1 | A | 1/1/1 |
| B | 3.0/3.8/3.8 | B | 3.4/3.4/3.4 | B | 2.8/2.8/2.8 | B | 2.8/2.8/2.8 |

By virtue of the present invention, it is now possible to provide multiple layer interlayers that reduce sound transmission and that are easily handled and readily incorporated into multiple layer constructs, such as laminated glass panels for windshields and architectural windows.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer layer can be formed comprising residual acetate content in any of the ranges given in addition to any of the ranges given for plasticizer, as well as having any of the $R_Z$, $R_{SM}$, and permanence values given, where appropriate, to form many permutations that are within the scope of the present invention but that would be cumbersome to list.

Any figure reference numbers given within the abstract or any claims are for illustrative purposes only and should not be construed to limit the claimed invention to any one particular embodiment shown in any FIGURE.

Figures are not drawn to scale unless otherwise indicated.

Each reference, including journal articles, patents, applications, and books, referred to herein is hereby incorporated by reference in its entirety.

We claim:

1. A polymer interlayer comprising:
   a first polymer layer comprising a plasticized thermoplastic polymer;
   a second polymer layer comprising a plasticized thermoplastic polymer; and,
   a third polymer layer comprising a plasticized thermoplastic polymer;
   wherein said second polymer layer is disposed between said first polymer layer and said third polymer layer;
   wherein said first polymer layer has a tensile break stress that is at least 15 kilograms per square centimeter greater than the tensile break stress of said second polymer layer;
   wherein said third polymer layer has a tensile break stress that is at least 15 kilograms per square centimeter greater than the tensile break stress of said second polymer layer;
   wherein the surface of said first polymer layer opposite said second polymer layer has an embossed Rz value of 50 to 90 microns; and,
   wherein said first polymer layer has a thickness 0.05 to 0.71 millimeters.

2. The interlayer of claim 1, wherein said surface of said first polymer layer opposite said second polymer layer has an embossed Rsm value of less than 700 microns.

3. The interlayer of claim 1, wherein the surface of said third polymer layer opposite said second polymer layer has an embossed Rz value of 50 to 90 microns, an embossed Rsm value of less than 700 microns, and a permanence of less than 95%.

4. The interlayer of claim 1, wherein said first polymer layer, said second polymer layer, and said third polymer layer each comprise poly(vinyl butyral).

5. The interlayer of claim 1, wherein the surface of said first polymer layer opposite said second polymer layer has an embossed Rz value of 50 to 70 microns.

6. A polymer interlayer comprising:
   a first polymer layer comprising a plasticized thermoplastic polymer;
   a second polymer layer comprising a plasticized thermoplastic polymer; and,
   a third polymer layer comprising a plasticized thermoplastic polymer;
   wherein said second polymer layer is disposed between said first polymer layer and said third polymer layer;

wherein said first polymer layer has a tensile break stress that is at least 15 kilograms per square centimeter greater than the tensile break stress of said second polymer layer;

wherein said third polymer layer has a tensile break stress that is at least 15 kilograms per square centimeter greater than the tensile break stress of said second polymer layer;

wherein the surface of said first polymer layer opposite said second polymer layer has a permanence value of less than 95%; and wherein said surface of said first polymer layer opposite said second polymer layer has an Rz value of 50 to 90 microns and a thickness of 0.05 to 0.71 millimeters.

7. A polymer interlayer comprising:

a first polymer layer comprising a plasticized thermoplastic polymer;

a second polymer layer comprising a plasticized thermoplastic polymer; and a third polymer layer comprising a plasticized thermoplastic polymer;

wherein said second polymer layer is disposed between said first polymer layer and said third polymer layer;

wherein said first polymer layer has a residual hydroxyl content of less than 25 weight percent;

wherein said second polymer layer has a residual hydroxyl content of less than 23 weight percent;

wherein the surface of said first polymer layer opposite said second polymer layer has an embossed Rsm value of less than 700 microns; and wherein said surface of said first polymer layer opposite said second polymer layer has an Rz value of 50 to 90 microns and a thickness of 0.05 to 0.71 millimeters.

* * * * *

UNITED STATES PATENT AND TRADEMARK OFFICE
CERTIFICATE OF CORRECTION

PATENT NO. : 7,883,761 B2  
APPLICATION NO. : 12/509107  
DATED : February 8, 2011  
INVENTOR(S) : Bourcier et al.

Page 1 of 1

It is certified that error appears in the above-identified patent and that said Letters Patent is hereby corrected as shown below:

Title Page, Item (75) Inventor is corrected to read:
-- David Paul Bourcier, Ludlow (MA);
John Joseph D'Errico, Glastonbury (CT);
Jean-Pierre Etienne, Rhode St Genese (BE);
Gary Matis, Wilbraham (MA);
Vincent James Yacovone, Springfield (MA);
Jun Lu, East Longmeadow (MA) --.

Signed and Sealed this
Sixth Day of October, 2015

Michelle K. Lee
*Director of the United States Patent and Trademark Office*